(12) United States Patent
Stein et al.

(10) Patent No.: US 10,823,244 B2
(45) Date of Patent: Nov. 3, 2020

(54) SPRING BASED BRAKE WEAR SENSOR

(71) Applicant: GOODRICH CORPORATION, Charlotte, NC (US)

(72) Inventors: Eric Stein, Dayton, OH (US); Alex Fahrenbruch, Tipp City, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 22 days.

(21) Appl. No.: 16/209,569

(22) Filed: Dec. 4, 2018

(65) Prior Publication Data

US 2020/0173509 A1    Jun. 4, 2020

Related U.S. Application Data

(60) Provisional application No. 62/773,567, filed on Nov. 30, 2018.

(51) Int. Cl.
| | | |
|---|---|---|
| *F16D 66/02* | (2006.01) | |
| *B64C 25/42* | (2006.01) | |
| *F16D 55/40* | (2006.01) | |
| *F16D 55/00* | (2006.01) | |
| *F16D 66/00* | (2006.01) | |

(52) U.S. Cl.
CPC ............ *F16D 66/025* (2013.01); *B64C 25/42* (2013.01); *F16D 55/40* (2013.01); *F16D 2055/0058* (2013.01); *F16D 2066/001* (2013.01)

(58) Field of Classification Search
CPC ...... F16D 66/02; F16D 66/021; F16D 66/022; F16D 66/025; F16D 55/36; F16D 55/40; F16D 2055/0058; F16D 2066/001; B64C 25/42

USPC ..... 188/1.11 E, 1.11 W, 1.11 R, 1.11 L, 71.5
See application file for complete search history.

(56) References Cited

U.S. PATENT DOCUMENTS

| | | | | |
|---|---|---|---|---|
| 3,772,912 A | * | 11/1973 | Andersson | ............ G01L 1/2218 73/862.629 |
| 4,241,603 A | * | 12/1980 | Han | ........................ F16D 55/40 188/1.11 L |
| 4,657,230 A | | 4/1987 | Weseloh | |
| 4,658,936 A | | 4/1987 | Moseley | |
| 5,228,541 A | * | 7/1993 | Plude | ....................... F16D 66/02 116/208 |
| 5,330,034 A | * | 7/1994 | Rancourt | ................. B64C 25/36 188/106 F |
| 5,651,430 A | | 7/1997 | Rancourt et al. | |
| 6,006,869 A | * | 12/1999 | Rancourt | ................ B64C 25/36 188/170 |

(Continued)

FOREIGN PATENT DOCUMENTS

| | | | | |
|---|---|---|---|---|
| JP | 57029914 A | * | 2/1982 | ................ G01N 3/00 |
| WO | 2006072802 | | 7/2006 | |

OTHER PUBLICATIONS

European Patent Office, European Search Report dated Apr. 15, 2020 in Application No. 19212701.7.

*Primary Examiner* — Thomas J Williams
(74) *Attorney, Agent, or Firm* — Snell & Wilmer L.L.P.

(57) ABSTRACT

A brake wear sensor is disclosed. In various embodiments, the brake wear sensor includes a bias member configured for connection between a stationary portion of a brake mechanism and a heat sink; and a load cell configured to measure a load in the bias member representative of a length of the heat sink.

14 Claims, 5 Drawing Sheets

(56) References Cited

U.S. PATENT DOCUMENTS

| | | | | |
|---|---|---|---|---|
| 8,464,842 | B2* | 6/2013 | Cahill | F16D 66/026 188/1.11 L |
| 8,827,046 | B2* | 9/2014 | Cahill | F16D 66/026 188/1.11 L |
| 2005/0121265 | A1* | 6/2005 | Deckhut | F16D 65/18 188/72.9 |
| 2006/0293801 | A1* | 12/2006 | Del Monte | G01B 7/02 701/2 |
| 2008/0202865 | A1* | 8/2008 | Pradier | F16D 66/02 188/1.11 W |
| 2015/0354652 | A1 | 12/2015 | Wong et al. | |
| 2020/0080609 | A1* | 3/2020 | Muniraju | F16D 66/023 |

* cited by examiner

SPRING BASED BRAKE WEAR SENSOR

CROSS-REFERENCE TO RELATED APPLICATIONS

This application claims priority to, and the benefit of, U.S. Prov. Pat. Appl., Ser. No. 62/773,567, entitled "Spring Based Brake Wear Sensor," filed on Nov. 30, 2018, the entirety of which is incorporated herein for all purposes by this reference.

FIELD

The present disclosure relates to aircraft wheel and brake assemblies and, more particularly, to brake wear sensors used in aircraft wheel and brake assemblies.

BACKGROUND

Aircraft typically utilize brake systems on wheels to slow or stop the aircraft during landings, taxiing and emergency situations, such as, for example, rejected takeoffs. The brake systems generally employ a heat sink comprising a series of friction disks, sandwiched between a pressure plate and an end plate, that may be forced into sliding contact with one another during brake applications to slow or stop the aircraft. Under various conditions, brake applications may generate high temperatures and frictional loads throughout the heat sink and particularly on the surfaces of the stators and rotors and the pressure plate and the end plate that comprise the heat sink. The stators and rotors and the pressure plate and the end plate withstand and dissipate the heat generated by the frictional loads. The frictional loads, however, eventually cause the stators and rotors and the pressure plate and the end plate to wear to a point where the heat sink should be serviced or replaced. Brake wear sensors may be used to monitor the health of the heat sink and provide an indication when service or replacement is warranted, either currently or at a predicted future time.

SUMMARY

A brake wear sensor is disclosed. In various embodiments, the brake wear sensor includes a bias member configured for connection between a stationary portion of a brake mechanism and a heat sink; and a load cell configured to measure a load in the bias member representative of a length of the heat sink.

In various embodiments, the bias member is a coil spring having a proximal end configured for connection to the stationary portion of the brake mechanism and a distal end configured for connection to the heat sink. In various embodiments, the distal end of the coil spring is configured for connection to a pressure plate of the heat sink. In various embodiments, the stationary portion of the brake mechanism is a piston housing. In various embodiments, the stationary portion of the brake mechanism is a torque tube.

In various embodiments, the bias member is a coil spring and the load cell is configured to measure the load in the coil spring. In various embodiments, the coil spring has a proximal end configured for connection to a piston housing and a distal end configured for connection to a pressure plate of the heat sink. In various embodiments, the load cell is a membrane strain gauge. In various embodiments, the load cell is configured to measure one of a compressive load or a tensile load within the bias member.

A brake mechanism is disclosed. In various embodiments, the brake mechanism includes a heat sink; a stationary portion; a bias member configured for connection between the stationary portion of the brake mechanism and the heat sink; and a sensor configured to measure a load in the bias member representative of a length of the heat sink.

In various embodiments, the heat sink comprises a pressure plate, a plurality of rotor disks, a plurality of stator disks and an end plate. In various embodiments, the bias member is a coil spring having a proximal end connected to the stationary portion and a distal end connected to the heat sink. In various embodiments, the distal end of the coil spring is connected to the pressure plate. In various embodiments, the stationary portion of the brake mechanism is a piston housing. In various embodiments, the stationary portion of the brake mechanism is a torque tube.

In various embodiments, the bias member is a coil spring and the sensor is configured to measure the load in the coil spring. In various embodiments, the sensor is a membrane strain gauge configured to measure one of a compressive load or a tensile load within the bias member.

A method of monitoring a length of a heat sink is disclosed. In various embodiments, the method includes the steps of measuring a load within a bias member connected to the heat sink; and translating the load to the length of the heat sink.

In various embodiments, the bias member is a coil spring having a proximal end connected to a stationary portion of a brake mechanism and a distal end connected to a pressure plate of the heat sink. In various embodiments, the stationary portion is one of a piston housing and a torque tube.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component. All ranges may include the upper and lower values, and all ranges and ratio limits disclosed herein may be combined. Unless specifically stated otherwise, reference to "a," "an" or "the" may include one or more than one and reference to an item in the singular may also include the item in the plural.

Figure 1A:
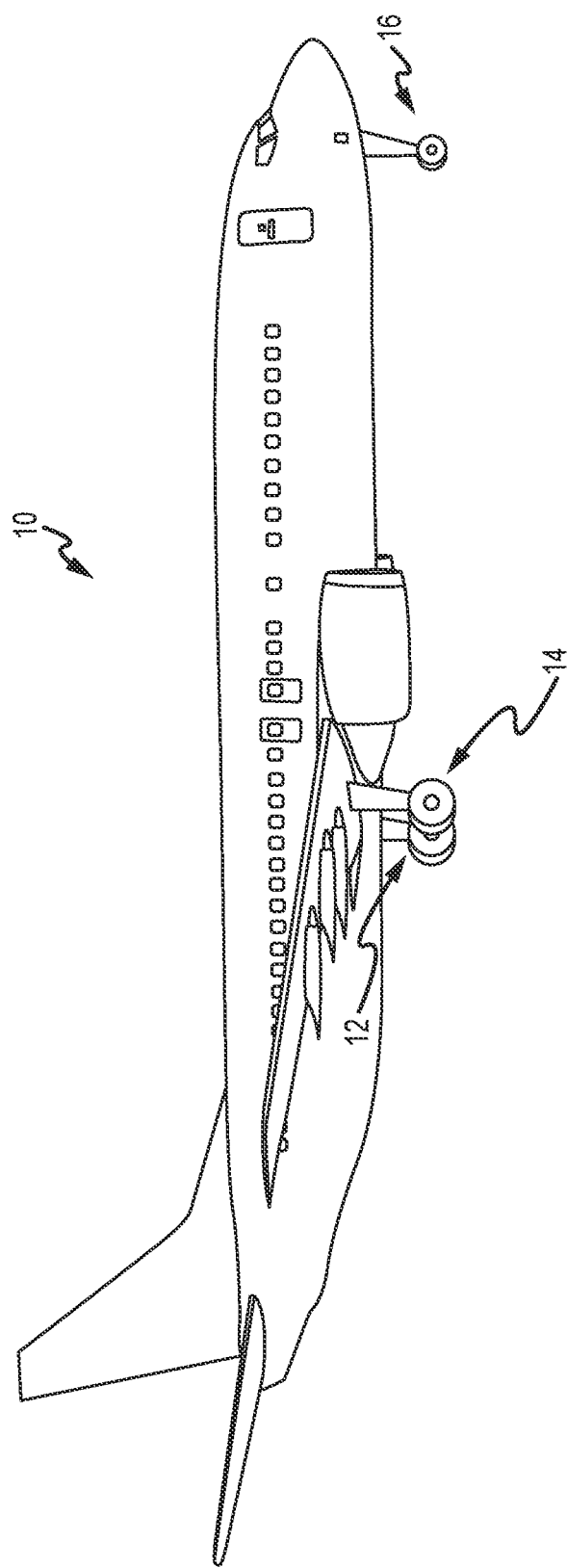
FIG. 1A illustrates an exemplary aircraft having a brake system, in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just described, the disclosure nevertheless contemplates any number of landing gear configurations.

Figure 1B:
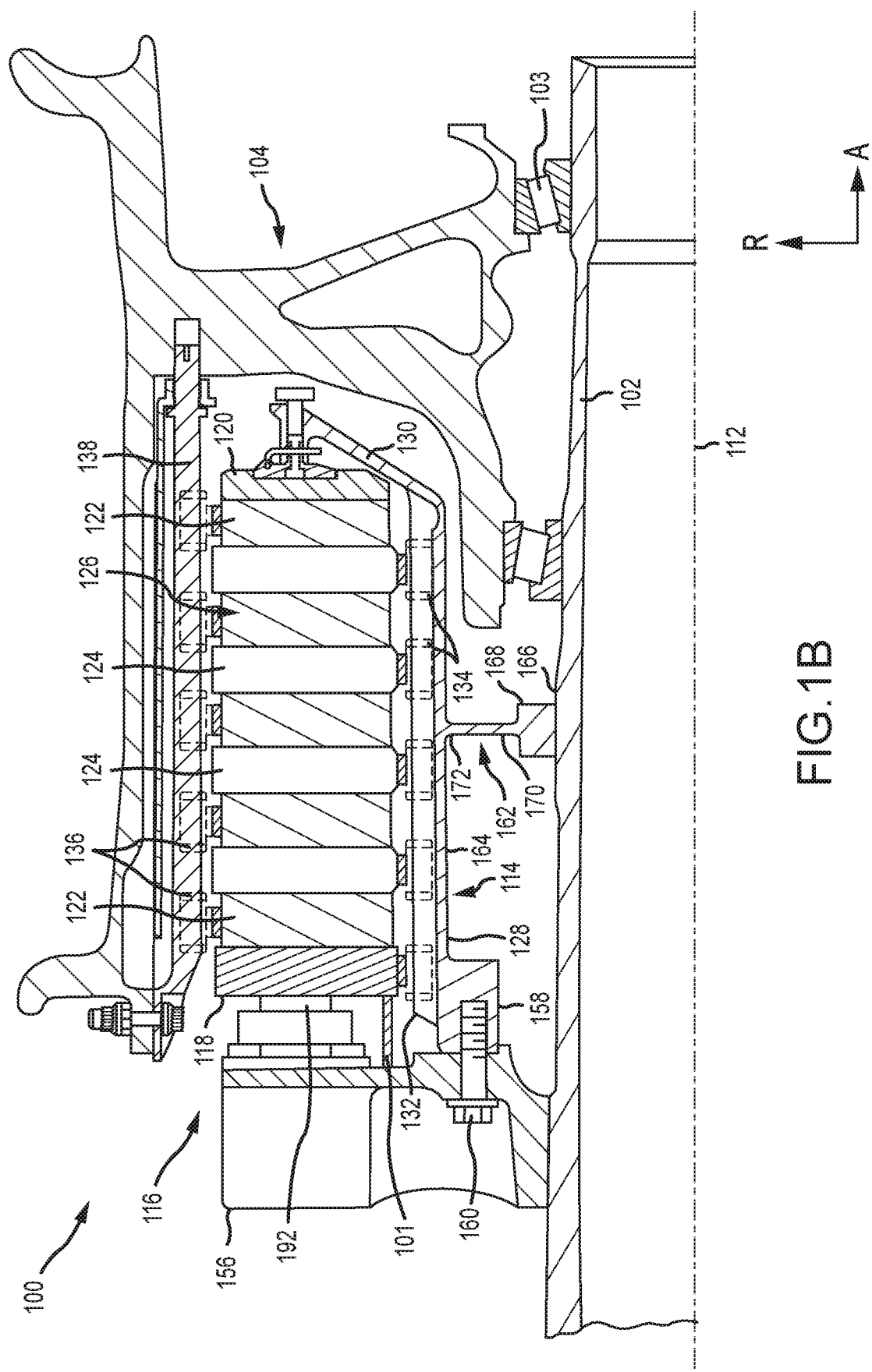
FIG. 1B illustrates a cross-sectional view of a brake mechanism, in accordance with various embodiments.

Referring now to FIG. 1B, there is schematically depicted a brake mechanism 100 configured for use on a landing gear, such as, for example, each of the left main landing gear 12 and the right main landing gear 14 described above with reference to FIG. 1A. In various embodiments, the brake mechanism is mounted relative to an axle 102 for use with a wheel 104 disposed on and configured to rotate about the axle 102 via one or more bearing assemblies 103. A central axis 112 extends through the axle 102 and defines a center of rotation of the wheel 104. A torque plate 114 (sometimes referred to as a torque tube) is aligned concentrically with the wheel 104, which is rotatable relative to the torque plate 114.

The brake mechanism 100 includes a piston housing assembly 116, a pressure plate 118 disposed adjacent the piston housing assembly 116, an end plate 120 positioned a distal location from the piston housing assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake heat sink or heat sink 126. The pressure plate 118, the end plate 120 and the plurality of stator disks 124 are connected to the torque plate 114 and remain rotationally stationary relative to the axle 102. The plurality of rotor disks 122 are connected to the wheel 104 and rotate relative to the pressure plate 118, the end plate 120 and the plurality of stator disks 124.

The torque plate 114 may include an annular barrel or torque tube 128 and an annular plate or back leg 130. The back leg 130 is disposed at an end distal from the piston housing assembly 116 and may be made monolithic with the torque plate 114, as illustrated in FIG. 1B, or may be made as a separate annular piece and suitably connected to the torque tube 128. The torque plate 114 has a plurality of circumferentially spaced and axially extending splines 132 disposed on an outer surface of the torque tube 128. The plurality of stator disks 124 and the pressure plate 118 include notches or slots 134 on an inner periphery of the disks and the plate for engagement with the splines 132, such that each disk and the plate are axially slidable with respect to the torque tube 128.

The end plate 120 is suitably connected to the back leg 130 of the torque plate 114 and is held non-rotatable, together with the plurality of stator disks 124 and the pressure plate 118, during a braking action. The plurality of rotor disks 122, interleaved between the pressure plate 118, the end plate 120 and the plurality of stator disks 124, each have a plurality of circumferentially spaced notches or slots 136 along an outer periphery of each disk for engagement with a plurality of torque bars 138 that are secured to or made monolithic with an inner periphery of the wheel 104.

An actuating mechanism for the brake mechanism 100 includes a plurality of piston assemblies, circumferentially spaced around a piston housing 156 (only one piston assembly is illustrated in FIG. 1B). Each of the plurality of piston assemblies includes a piston 192 configured to apply a load against the pressure plate 118. Upon actuation, the plurality of piston assemblies affect a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as ceramic matrix composites, that enable the brake disks to withstand and dissipate the heat generated during and following a braking action.

The torque plate 114 is secured to a stationary portion of the landing gear such as the axle 102, preventing the torque plate 114, the end plate 120, the pressure plate 118, and the plurality of stator disks 124 from rotating during braking of the aircraft. The torque tube 128 portion of the torque plate 114 may be attached to the piston housing 156 via an annular mounting surface 158, wherein bolt fasteners 160 secure the torque plate 114 to the piston housing 156. A spacer member or pedestal 162 is positioned between an inner diameter surface 164 of the torque tube 128 and an outer diameter surface 166 of the axle 102. The pedestal 162 includes a radially inner surface or foot 168 for engaging the axle 102, a web portion 170 radially outward of the foot 168 and a head portion 172 for engaging the inner diameter surface 164 of the torque tube 128. The pedestal 162 augments support of the torque plate 114 within the brake mechanism 100 generally and, more particularly, against the axle 102. The pedestal 162 may be made monolithic with the torque tube 128 portion of the torque plate 114.

In various embodiments, a brake wear sensor 101 is disposed between the piston housing 156 and the pressure plate 118 (or, in various embodiments, between a torque tube mount and the pressure plate 118). The brake wear sensor 101 is configured to monitor wear occurring within the heat sink 126, primarily due to frictional contact occurring between adjacent surfaces of the pressure plate 118, the end plate 120, the plurality of rotor disks 122 and the plurality of stator disks 124. While the frictional contact slows or stops or otherwise prevents rotation of the wheel 104, it also causes wear to occur on the various surfaces within the heat sink 126. Over time, such wear may result in the various components just described becoming progressively thinner in the axial direction. The progressive thinning of the various components results in the need for longer travel of the piston within each piston assembly to affect braking. As described further below, in various embodiments, the brake wear sensor 101 is configured to monitor the progress of such wear within the heat sink 126 and to alert maintenance personnel when repair or replacement of the heat sink 126 is warranted.

Figure 2A:
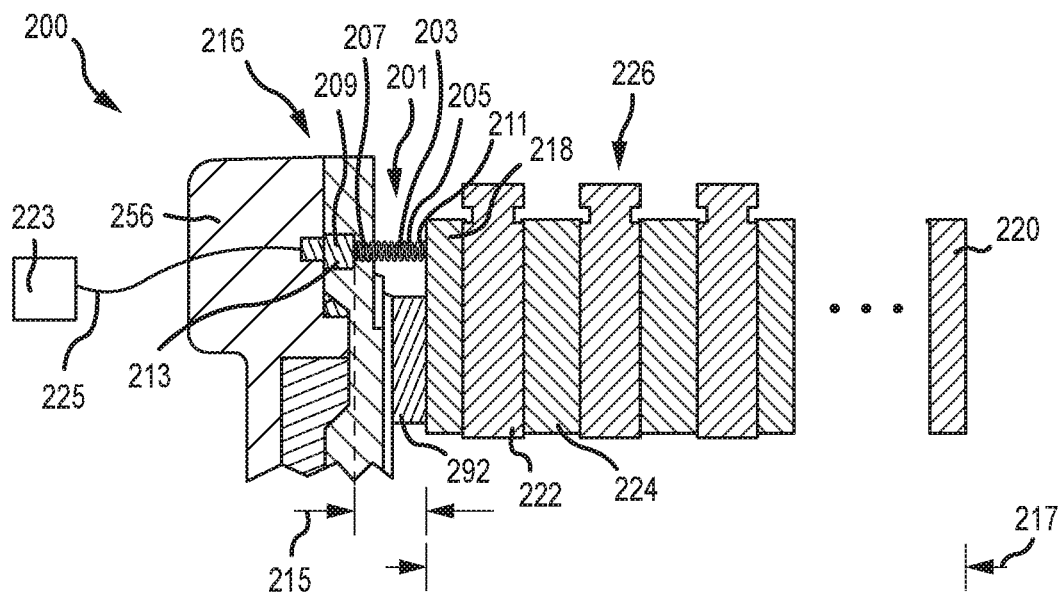
FIGS. 2A and 2B illustrate a sectional view of a brake mechanism having a brake wear sensor, in accordance with various embodiments.
Figure 2B:
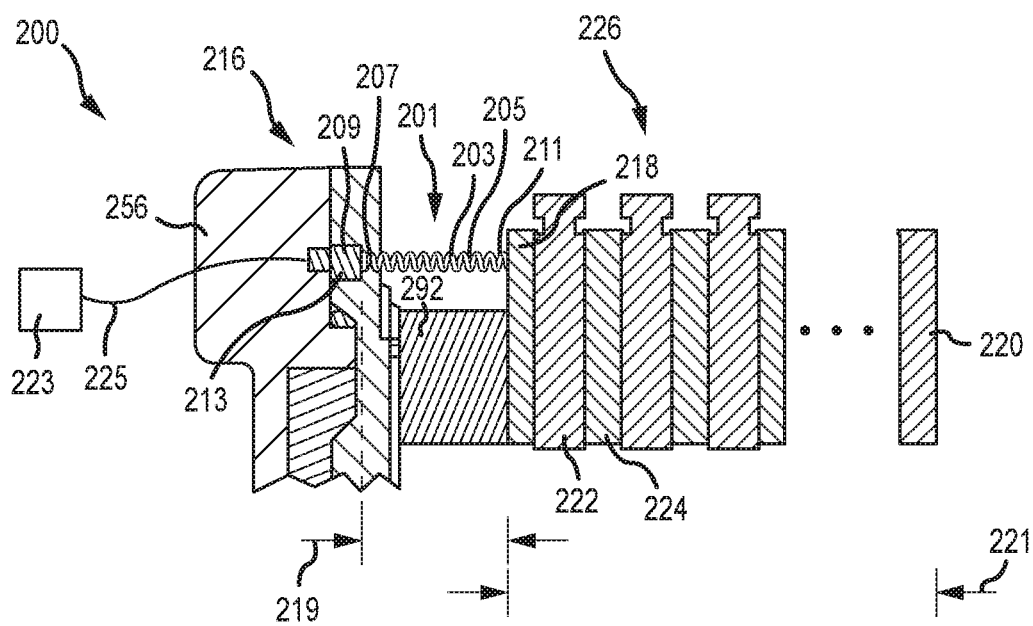

Referring now to FIGS. 2A and 2B, a sectional view of a brake mechanism 200 is provided, such as, for example, the brake mechanism 100 described above with reference to FIG. 1B. In various embodiments, the brake mechanism 200 includes a piston housing assembly 216, a pressure plate 218 disposed adjacent the piston housing assembly 216, an end plate 220 positioned a distal location from the piston housing assembly 216, and a plurality of rotor disks 222 interleaved with a plurality of stator disks 224 positioned intermediate the pressure plate 218 and the end plate 220. The piston housing assembly 216 includes a piston 292 configured to apply a load against the pressure plate 218 during a braking actuation. Similar to the discussion above with reference to FIG. 1B, the pressure plate 218, the plurality of rotor disks 222, the plurality of stator disks 224 and the end plate 220 together form a brake heat sink or heat sink 226. The pressure plate 218, the end plate 220 and the plurality of stator disks 224 are mounted to a torque plate and remain rotationally stationary relative to an axle, while the plurality of rotor disks 222 are mounted to a wheel and rotate relative to the axle.

Still referring to FIGS. 2A and 2B, a brake wear sensor 201 is disposed between a piston housing 256 and the pressure plate 218. In various embodiments, the brake wear sensor 201 includes a bias member 203, such as, for example, a coil spring 205. The coil spring 205 includes a proximal end 207 that is connected to a sensor housing 209 and a distal end 211 that is connected to the pressure plate 218. As used in this disclosure, one component (e.g., a coil spring) being connected to another component (e.g., a sensor housing or a pressure plate) does not preclude intervening elements between the components for such connection to be established. A sensor 213 (e.g., a load cell, strain gauge or membrane) is disposed within the sensor housing 209 and configured to translate a level of compressive force within the coil spring 205 to a level of brake wear experienced within the heat sink 226. For example, referring to FIG. 2A, the coil spring 205 exhibits a nominal spring length 215 ($X_0$) when, say, the heat sink 226 is new or components thereof have been replaced within the brake mechanism 200. At this point, the heat sink 226 will exhibit a nominal stack length 217 ($L_0$). After the heat sink 226 has undergone use, the heat sink 226 will have experienced wear and will exhibit a worn stack length 221 ($L_W$), where the worn stack length 221 is less than the nominal stack length 217. Conversely, the coil spring 205 will exhibit a corresponding increase in length to a worn-brake spring length 219 ($X_W$).

As may be gleaned from FIGS. 2A and 2B, a relationship exists between the change in the length of the heat sink 226, $\Delta L = L_0 - L_W$ ($\Delta L \geq 0$), due to wear and the corresponding change in the length of the coil spring 205, $\Delta X = X_W - X_0$, ($\Delta X \geq 0$), such that $\Delta L = \Delta X$. In various embodiments, the sensor 213 may thus be configured to translate the compressive force provided by the coil spring 205 on the sensor 213 into a change in length of the heat sink 226. For example, through Hooke's Law, the force on the sensor 213 may be approximated by $F = F_0 - k(\Delta X)$, where $F_0$ is the nominal force on the sensor 213 when $\Delta X = 0$ and k is the spring constant of the coil spring 205. As $\Delta X$ increases from zero to values greater than zero, due to $\Delta L$ correspondingly increasing from zero to values greater than zero, the force, F, on the sensor 213 will decrease because of the decreasing compressive load within the coil spring 205. By algebraic manipulation of the foregoing relationship, the change in the length of the heat sink 226, $\Delta L = L_0 - L_W$ ($\Delta L \geq 0$), may be approximated in real time by monitoring the compressive load on the sensor 213 through the relation $\Delta L = (F_0 - F)/k$. In various embodiments, a real-time signal representative of the compressive force, F, within the coil spring 205, as measured by the sensor 213, may be provided to a processor 223 via a data bus 225 and converted into a real-time measurement of the change in the length of the heat sink 226, $\Delta L$. This real-time monitoring of the change in the length of the heat sink 226, $\Delta L$, may then be reported in real time to the aircraft cockpit or to maintenance personnel while the aircraft is on the ground.

Figure 3A:
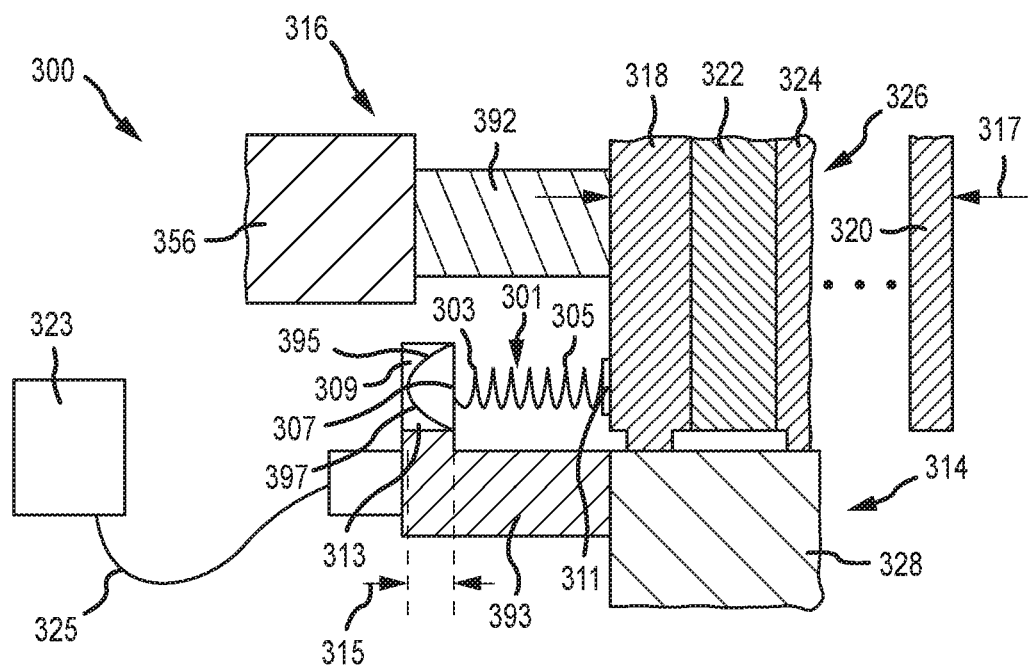
FIGS. 3A and 3B illustrate a sectional view of a brake mechanism having a brake wear sensor, in accordance with various embodiments.
Figure 3B:
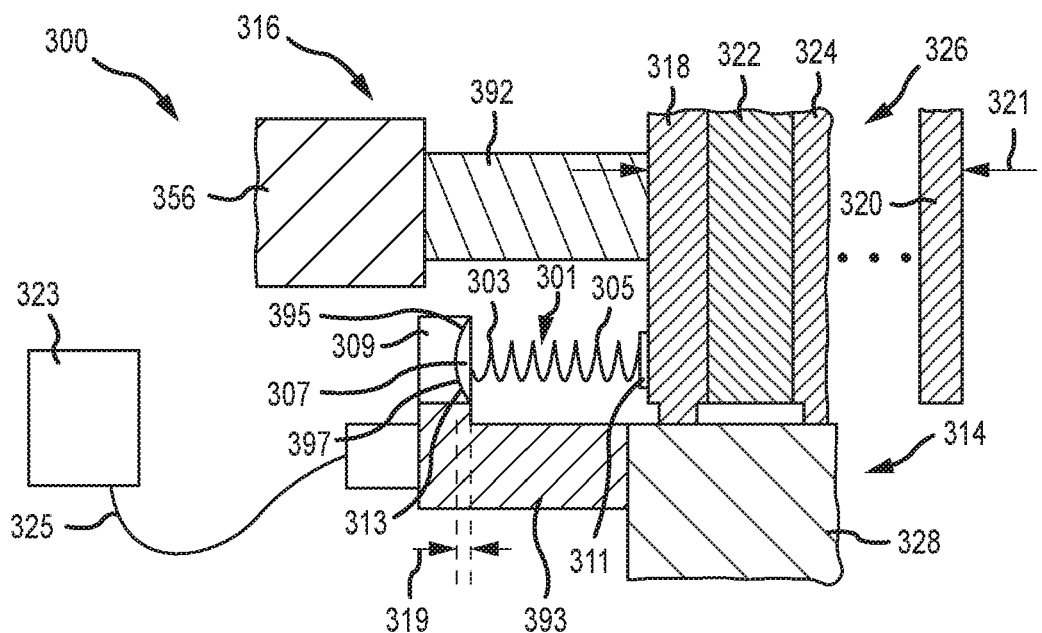

Referring now to FIGS. 3A and 3B, a sectional view of a brake mechanism 300 is provided, such as, for example, the brake mechanism 100 described above with reference to FIG. 1B. In various embodiments, the brake mechanism 300 includes a piston housing assembly 316, a torque plate 314, a pressure plate 318 disposed adjacent and connected to the torque plate 314, an end plate 320 positioned a distal location from the piston housing assembly 316, and a plurality of rotor disks 322 interleaved with a plurality of stator disks 324 positioned intermediate the pressure plate 318 and the end plate 320. The piston housing assembly 316 includes a piston housing 356 and a piston 392 configured to apply a load against the pressure plate 318 during a braking actuation. Similar to the discussion above with reference to FIG. 1B, the pressure plate 318, the plurality of rotor disks 322, the plurality of stator disks 324 and the end plate 320 together form a brake heat sink or heat sink 326. The pressure plate 318, the end plate 320 and the plurality of stator disks 324 are mounted to a torque tube 328 portion of the torque plate 314 and remain rotationally stationary relative to an axle, while the plurality of rotor disks 222 is mounted to a wheel and rotate relative to the axle.

Still referring to FIGS. 3A and 3B, a brake wear sensor 301 is disposed between a sensor mount 393 and the pressure plate 318, the sensor mount 393 being connected, in various embodiments, to the torque plate 314. In various embodiments, the brake wear sensor 301 includes a bias member 303, such as, for example, a coil spring 305. The coil spring 305 includes a proximal end 307 that is connected to a sensor housing 309 and a distal end 311 that is connected to the pressure plate 318. As noted above, one component (e.g., a coil spring) being connected to another component (e.g., a sensor housing or a pressure plate) does not preclude intervening elements between the components for such connection to be established. A sensor 313 (e.g., a load cell, strain gauge or membrane) is disposed within the sensor housing 309 and configured to translate a level of compressive force within the coil spring 305 to a level of brake wear experienced within the heat sink 326. In various embodiments, the sensor 313 comprises a membrane strain gauge 395, configured to translate elastic strain within a membrane 397 of the membrane strain gauge 395 into a signal representative of the strain and, correspondingly, representative of a change in length of the heat sink 326. For example, referring to FIG. 3A, the membrane 397 exhibits a nominal membrane length 315 ($X_O$) when, say, the heat sink 326 is new or components thereof have been replaced within the brake mechanism 300. At this point, the heat sink 326 will exhibit a nominal stack length 317 ($L_O$). After the heat sink 326 has undergone use, the heat sink 326 will have experienced wear and will exhibit a worn stack length 321 ($L_W$), where the worn stack length 321 is less than the nominal stack length 317. Conversely, the membrane 397 will exhibit a corresponding decrease in length to a worn-brake membrane length 319 ($X_W$). While in various embodiments, as just described, the change in length of the heat sink 326 may be related to a change in length of the membrane 397 (or to a change in resistance of the membrane strain gauge 395), relations similar to those referring to a change in length of the coil spring 305, as were described in reference to FIGS. 2A and 2B, may also be employed.

Similar to the discussion above with reference to FIGS. 3A and 3B, a relationship may be derived linking the change in the length of the heat sink 326, $\Delta L = L_O - L_W$ ($\Delta L \geq 0$), due to wear and the corresponding change in the length of the membrane 397, $\Delta X = X_W - X_O$, ($\Delta X \leq 0$), such that $\Delta L = -\Delta X$. In various embodiments, the change in length of the membrane 397, as well as the change in length of the heat sink 326, will translate to a change in resistivity over the membrane strain gauge 395, which may be converted into a real-time signal representative of the change in the length of the heat sink 326, $\Delta L$. This real-time monitoring of the change in the length of the heat sink 326, $\Delta L$, may then be reported in real time to the aircraft cockpit or to maintenance personnel while the aircraft is on the ground. As described above, a processor 323 connected to the sensor 313 via a data bus 325 may be used to process data received by the sensor 313 into data representing the change in the length of the heat sink 326, $\Delta L$.

Figure 4:
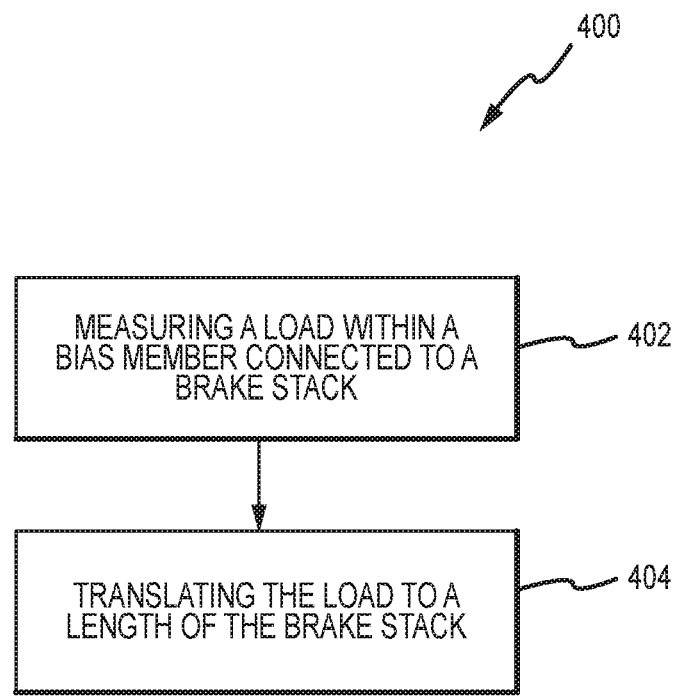
FIG. 4 illustrates a method of monitoring a length of a heat sink.

Referring now to FIG. 4, a method 400 of monitoring a length of a heat sink disposed, for example, within a brake mechanism is described. In a first step 402, the method includes measuring a load within a bias member connected between a stationary portion of a brake mechanism and the heat sink. In a second step 404, the method includes translating the load to the length of the heat sink. In various embodiments, the bias member is a coil spring having a proximal end connected to the stationary portion of the brake mechanism and a distal end connected to a pressure plate of the heat sink and the step of translating the load to the length of the heat sink may be carried out using Hooke's Law. In various embodiments, the stationary portion is one of a piston housing and a torque tube.

The foregoing provides an apparatus in which a length or a change in the length of a heat sink is monitored by a bias element, such as, for example, a coil spring. In various embodiments, a method of monitoring the length or the change in length includes measuring a load within a bias member connected between a stationary portion of the brake mechanism and the heat sink and translating or relating the measured load to the length of the heat sink or to the change in length of the heat sink. In various embodiments, a resistive element may be employed to measure the load within the bias element or coil spring. In various embodiments, the load within the bias element may be a compressive load or a tensile load (or transition from one to the other) and be related to the length or to the change in the length of the heat sink through a mathematical relation, such as, for example, a mathematical relation based on Hooke's Law or through a correlation of measured resistance as a function of the length or the change in the length of the heat sink.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A brake wear sensor, comprising:
   a bias member configured for connection between a load cell coupled to a stationary portion of a brake mechanism and a heat sink,
   wherein the load cell is configured to measure a compressive load in the bias member representative of a length of the heat sink and the bias member comprises a distal end connected to a pressure plate of the heat sink and a proximal end connected to a strain gauge within the load cell.

2. The brake wear sensor of claim 1, wherein the bias member is a coil spring.

3. The brake wear sensor of claim 1, wherein the load cell is a membrane strain gauge.

4. The brake wear sensor of claim 2, wherein the stationary portion of the brake mechanism is a piston housing.

5. The brake wear sensor of claim 2, wherein the stationary portion of the brake mechanism is a torque tube.

6. A brake mechanism, comprising:
   a heat sink;
   a stationary portion; and
   a bias member configured for connection between a sensor coupled to the stationary portion of the brake mechanism and the heat sink,
   wherein the sensor is configured to measure a compressive load in the bias member representative of a length of the heat sink and the bias member comprises a distal end connected to a pressure plate of the heat sink and a proximal end connected to a strain gauge within the sensor.

7. The brake mechanism of claim 6, wherein the heat sink comprises the pressure plate, a plurality of rotor disks, a plurality of stator disks and an end plate.

8. The brake mechanism of claim 7, wherein the bias member is a coil spring.

9. The brake mechanism of claim 8, wherein the stationary portion of the brake mechanism is a piston housing.

10. The brake mechanism of claim 8, wherein the stationary portion of the brake mechanism is a torque tube.

11. The brake mechanism of claim 8, wherein the sensor is a membrane strain gauge configured to measure the compressive load within the bias member.

12. A method of monitoring a length of a heat sink within a brake mechanism, comprising:
    measuring a compressive load within a bias member connected to the heat sink, the bias member comprising a distal end connected to a pressure plate of the heat sink and a proximal end connected to a strain gauge within a sensor coupled to a stationary portion of the brake mechanism; and
    translating the compressive load to the length of the heat sink.

13. The method of claim 12, wherein the bias member is a coil spring.

14. The method of claim 13, wherein the stationary portion is one of a piston housing and a torque tube.

* * * * *